United States Patent [19]
McCordall

[11] 3,979,964
[45] Sept. 14, 1976

[54] POWER TRANSMISSION DEVICES

[75] Inventor: Derek D. McCordall, Dunstable, England

[73] Assignee: Neil and Spencer Limited, England

[22] Filed: Apr. 21, 1975

[21] Appl. No.: 569,593

[30] Foreign Application Priority Data
Apr. 27, 1974 United Kingdom............... 18555/74
Sept. 17, 1974 United Kingdom............... 40336/74

[52] U.S. Cl......................... 74/242.8; 74/242.1 R; 74/242.15 R
[51] Int. Cl.²...................... F16H 7/08; F16H 7/12; F16H 7/10
[58] Field of Search..... 74/242.8, 242.1 R, 242.1 A, 74/242.14 R, 242.15 R

[56] References Cited
UNITED STATES PATENTS

| | | |
|---|---|---|
| 2,292,952 | 8/1942 | MacDonald .................. 74/242.8 X |
| 2,696,741 | 12/1954 | Wilkin........................... 74/242.1 R |
| 3,306,372 | 2/1967 | Struve....................... 74/242.1 R X |
| 3,796,275 | 3/1974 | Bouyer...................... 74/242.1 R X |

*Primary Examiner*—Leonard H. Gerin
*Attorney, Agent, or Firm*—Larson, Taylor and Hinds

[57] ABSTRACT

A drive system comprising a first pulley operably connected to drive a second pulley by a continuous stiff belt having a driving face which is wrapped around both of said pulleys, means for causing the belt to slacken relatively to the pulleys, and guide means for bearing upon a face of the slackened belt generally opposed to said driving face, thereby shaping the slackened belt to prevent driving contact with at least one of the pulleys. The drive system can be used to drive a washing or dry cleaning machine at two or three different speeds depending upon which of two motors, connected to respective ones of the pulleys, is running.

9 Claims, 6 Drawing Figures

POWER TRANSMISSION DEVICES

This invention relates to pulley-and-belt drive systems, and particularly concerns the removal of driving belts from contact with pulleys to prevent power being transmitted thereby.

The inventive principle may be used to isolate a part of the drive system which is not required to drive, or be driven, at that time because it may absorb power from the system wastefully if left connected, or because it may be damaged by being over-speeded or driven in a wrong direction by some other source of power in the system. A drive system embodying the inventive principle is thus a form of power transmission clutch, and can perform most of the functions of such equipment.

According to the present invention, a drive system comprises a first pulley operably connected to drive a second pulley by a continuous stiff belt having a driving face which is wrapped around both of said pulleys, means for causing the belt to slacken relatively to the pulleys, and guide means for bearing upon at least that face of the slackened belt generally opposed to said driving face, thereby shaping the slackened belt to prevent driving contact with at least one of the pulleys.

The reader will appreciate that were it not for the guide means, the slackened belt would be capable of lying in contact with one or both of the pulleys by virtue of its own weight and random shape.

Preferably at least a part of the guide means is movable from a first position in which power is transmitted by the drive system, to a second position in which power transmission is interrupted by said shaping of the slackened belt. When in said second position, the guide means preferably bears against substantially all of the length of the slackened belt.

The means for slackening the belt may comprise a pivotal mounting for at least one of the pulleys, the arrangement being such that the separation of the pulleys can be selectively varied by pivoting thereof. Alternatively, however, the belt slackening means may comprise a jockey pulley which is movable between different positions in which different tensions are applied thereby to the driving face of the belt.

Although there are clearly many applications in which the present inventive principle can be utilised, one particularly preferred application is in the drive system of a washing or dry cleaning machine. If the pulleys are of different diameter and are connected to be driven by respective motors, it is possible to so connect the drive system that an operating shaft of the washing or dry cleaning machine is driven at two different speeds depending upon which of the two motors is running. Moreover, by use of a lay shaft forming part of a gear train, the lay shaft being connected to one of said motors by a further pulley-and-belt drive system embodying the present invention, the operating shaft can be driven at three different speeds.

Various embodiments of drive systems according to the present invention will now be described, by way of example only, with reference to the accompanying drawings, in which.

Figure 1A:
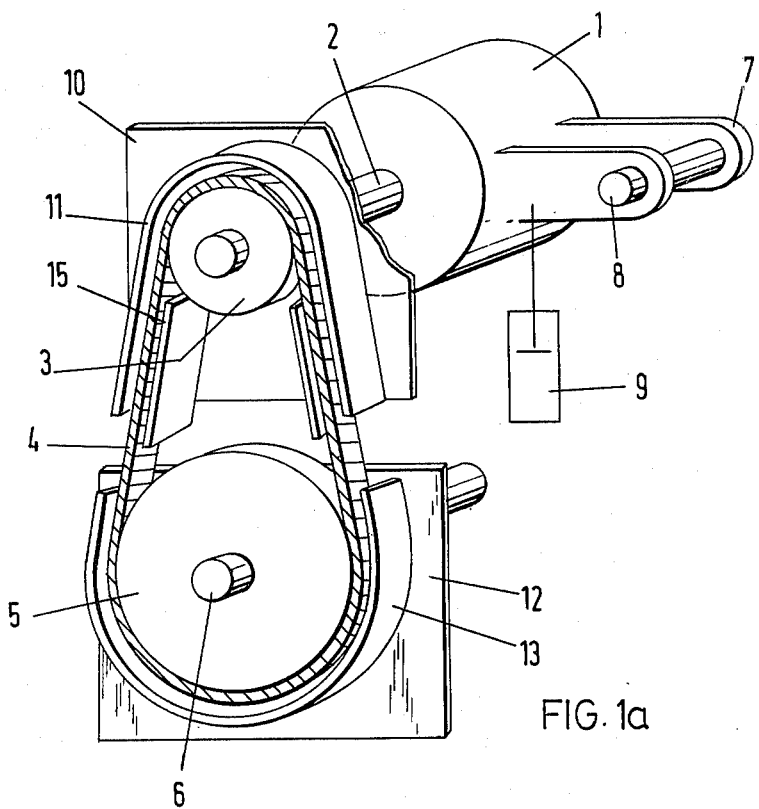
FIG. 1a is a perspective view of a drive system in which a pulley is pivotally mounted.
Figure 1B:
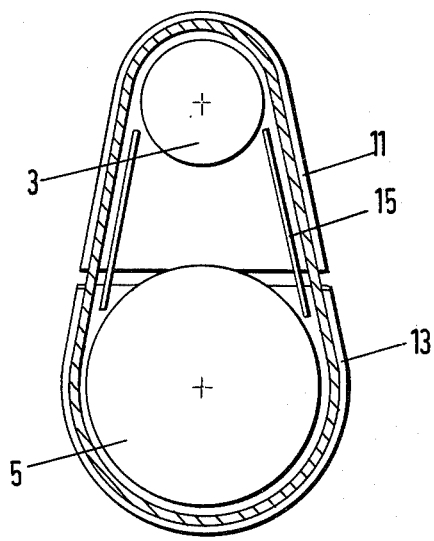
FIG. 1b is a schematic end elevation illustrating the position assumed by the slackened belt when the guide means is in its second position.

FIGS. 1a and 1b show a motor 1 to a shaft 2 of which is fitted a pulley 3 driving a continuous stiff belt 4, which in turn drives a pulley 5 connected to a second shaft 6. The motor 1 is mounted on a lug 7 pivoted about an axle 8. The angular position of the motor 1 about the axle 8 is controlled by an air piston 9, which by its degree of extension can increase or reduce the distance between the centres of the pulleys 3 and 5. A first plate 10 is mounted on the motor 1 and carries curved strips 11 which extend perpendicularly therefrom. A second plate 12 is fixed to a part of the machine (not shown), lies in the same plane as the first plate 10, and has similar curved strips 13 mounted normally thereon.

FIG. 1a shows the system in its driving position, the separation of the pulleys 3 and 5 being such that power is transmitted from the motor 1 to the second pulley 5. FIG. 1b shows the system in its disconnected position, in which the centre distance between the pulleys 3 and 5 has been reduced so that drive is not transmitted.

It will be noted that the pivotal mounting of the pulley 3 constitutes belt slackening means according to the present invention, and that if desired the other pulley 5 could also be pivotally mounted. Moreover, it is clear from FIG. 1b that the curved strips 11 and 13, which constitute guide means according to the present invention, bear against substantially all of the length of the slackened belt 4, and shape that belt 4 so that it is in driving contact with neither of the pulleys 3 and 5, or is not in sufficient contact to transmit power.

Figure 2A:
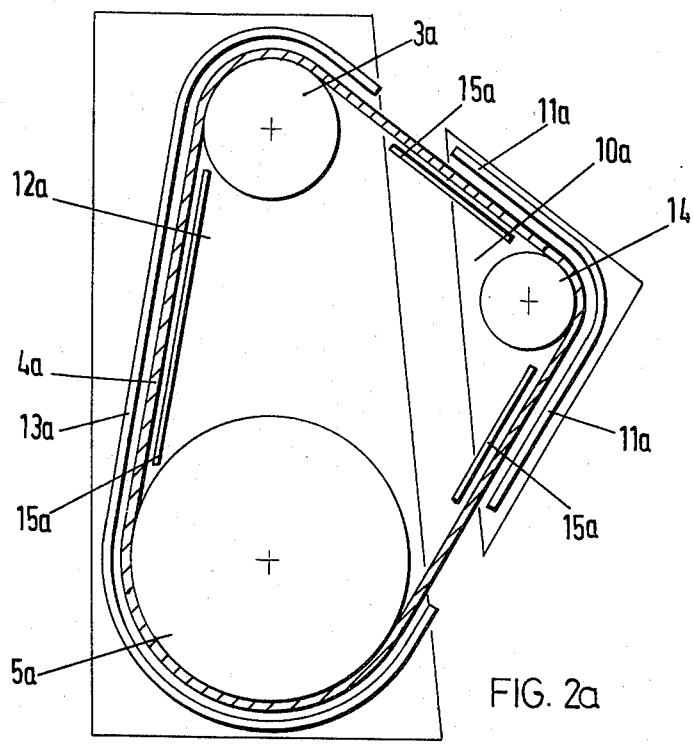
FIGS. 2a and 2b are both schematic end elevations, similar to FIG. 1b, showing a second drive system incorporating a jockey pulley, with the guide means in its first and second positions respectively.
Figure 2B:
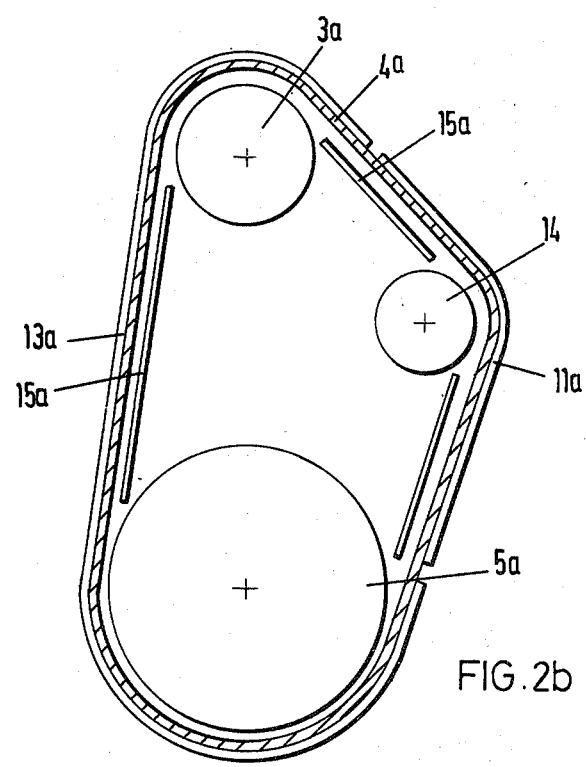

FIGS. 2a and 2b are generally similar to FIGS. 1a and 1b. In this case, however, the separation of pulleys 3a and 5a is fixed, and the slackening of belt 4a is produced by movement of a jockey pulley 14 by means not shown.

A plate 10a is mounted with the jockey pulley 14 and carries curved strips 11a, a plate 12a being mounted in the same plane as the plate 10a and carrying curved strips 13a. The plate 12a is fixed relatively to the pulleys 3a and 5a. The jockey pulley 14 is movable between different positions in which different tensions are applied thereby to a driving face of the belt 4a i.e. that face which is wrapped around both of the pulleys 3a and 5a. In the disconnected position of the drive system, shown in FIG. 2b, the guide means bears upon that face of the slackened belt 4a generally opposed to said driving face, thereby shaping the slackened belt to prevent driving contact with either of the pulleys 3a and 5a.

In each of the two drive systems described above, a part of the guide means (11, 11a) is movable from a first position in which power is transmitted by the drive system, to a second position in which power transmission is interrupted by said shaping of the slackened belt. Alternatively, all of the guide means may be movable to shape the slackened belt. In addition to the curved strips 11, 13 and 11a, 13a further strips 15 and 15a may be provided, as shown in the accompanying drawings, to form channels for the slackened belts 4 and 4a respectively. Although belts of very stiff material never lie against the strips 15 and 15a, it has been found that they can act to prevent belts of relatively less stiff material from flexing inwardly when slack. In other arrangements (not shown) the guide means could be formed as, for example, flat plates, fixed or rotatable rods, or shaped angle-pieces. Any cross-sectional configuration of belt may be used, even for example one of circular cross-section, and the form of the pulley need only be such as to suit the belt.

Figure 3:
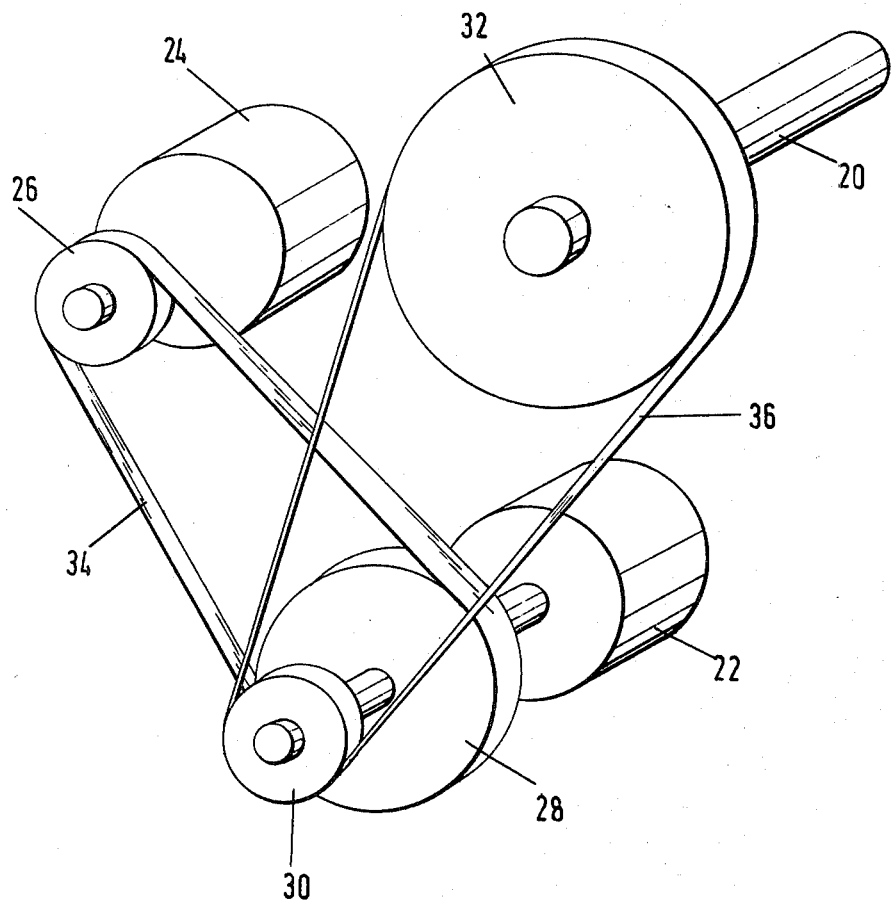
FIG. 3 is a perspective view of a third drive system in which both of its pulleys are connected to be driven by a respective motor.

A particular application of the drive systems described above is to a washing machine as shown in FIG. 3. In this application, it is required to drive an operating shaft 20 of the washing machine at two different speeds by use of two standard single-speed motors 22 and 24. The required speeds are such, and the ratios between the diameters of pulleys 26, 28, 30 and 32 are such, as to cause that motor producing the lower speed (motor 24) to be turned over, during running of the higher speed motor, at a speed which would damage said low-speed motor unless a system according to the invention were used to interrupt the power transmission. FIG. 3 shows a schematic representation of a washing machine drive, in which the low-speed motor 24 has a synchronous speed of 1500 rpm. The pulley 26 mounted thereon drives, by means of a belt 34, the pulley 28 mounted on the high-speed motor 22 having a synchronous speed of 3000 rpm. The motor 22 also carries the pulley 30 for driving the pulley 32, which is mounted on the operating shaft 20 of the washing machine, through a second belt 36. The ratio in diameters of the pulleys 26 and 28 is 5:1, and that between the pulleys 30 and 32 is 10:1. Without a clutch or a system according to the present invention mounted in the drive, when the motor 24 runs the operating shaft 20 would be rotated at 30 rpm, whilst the motor 22 would be turned over at 300 rpm. When the motor 22 runs, however, the operating shaft 20 would be rotated at 300 rpm but the first motor 24 would be turned over at 15,000 rpm. Such a state of affairs would certainly damage the motor 24. The damage can be avoided by fitting a system according to the present invention to disengage the belt 34 from at least the pulley 28 whenever the motor 22 is run.

Figure 4:
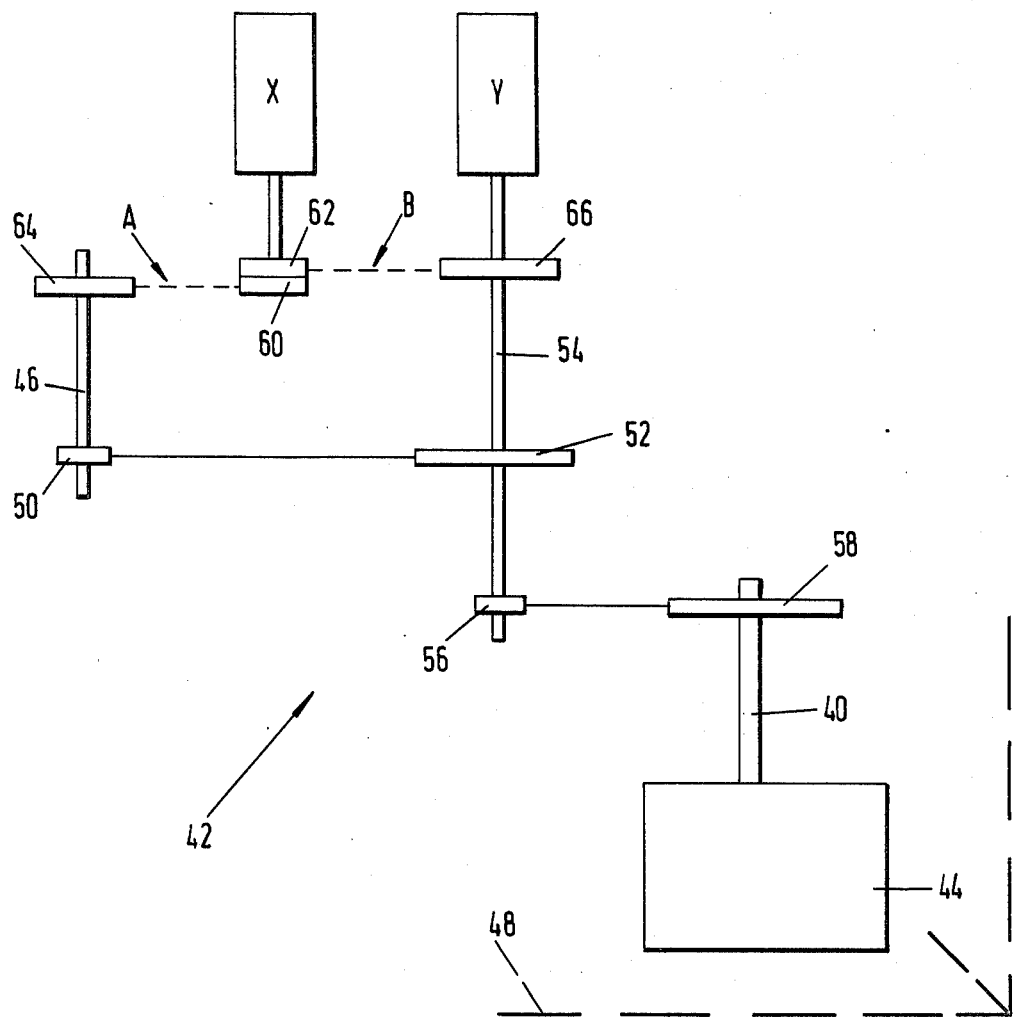
FIG. 4 is a schematic drawing illustrating the layout of a fourth drive system for the operating shaft of a washing machine.

In a further application, shown in FIG. 4, an operating shaft 40 is connected at one end to a gear train 42 which can be driven alternately by either motor X or motor Y, both motors having a synchronous speed of for example 1,500 rpm. The other end of the operating shaft 40 drives a cylinder 44 of either a washing or a dry cleaning machine, shown in dotted fragmentary outline at 48. The gear train 42 includes a lay shaft 46 carrying a pulley 50 which can drive a pulley 52 mounted upon an output drive 54, a second pulley 56 mounted upon the output drive 54 being connected to drive a pulley 58 carried by the operating shaft 40. The ratio in diameters between the pulleys 50 and 52 is 2.5:1, and that between the pulleys 56 and 58 is 5:1.

The motor X has a drive shaft carrying two pulleys 60 and 62; the pulley 60 can be connected by a belt A (shown in dotted outline) to drive a pulley 64 carried by the lay shaft 46, and similarly the pulley 62 can be connected by a belt B (also shown in dotted outline) to drive a pulley 66 mounted upon the output drive 54. Each of the belts A and B can be shaped by guide means (not shown) to prevent driving contact of either the belt A with the pulley 64, or alternatively the belt B with the pulley 66. The details of construction of the guide means, and their manner of operation, are exactly as described hereinbefore. The ratio in diameters between the pulley 60 and the pulley 64 is 4:1, and that between the pulley 62 and the pulley 66 is 2:1.

FIG. 4 illustrates the position assumed by the motor X when the belt B makes driving contact with its associated pulley 66, the belt A being slack. If the output drive 54 is driven directly by the motor Y at 1,500 rpm, this leads to the operating shaft 40 being driven at 300 rpm. The reader will note that the motor X is driven through the belt B and rotates at 3,000 rpm. However, the reader will be aware that a speed of rotation of this magnitude has no deleterious effect on a synchronous motor, and in practice is quite acceptable. The lay shaft 46 is driven through the pulleys 52 and 50 and rotates at 3,750 rpm, but this rotation is not transmitted to the motor X because of belt A is in the above-mentioned slackened or disengaged condition. This is most important because otherwise motor X would be turned over at 15,000 rpm, which is certainly a sufficiently high speed of rotation to cause it serious damage.

If the motor Y is stopped, and the motor X brought into operation, then the output drive 54 will be driven at 750 rpm through the belt B, leading to the operating shaft 40 being driven at 150 rpm. Moreover, should the motor X be moved to the right (as shown in FIG. 4), the belt B would become disengaged and the belt A would tighten to allow the motor X to drive the lay shaft 46 at 375 rpm. The output drive 54 would thus be driven at 150 rpm and the operating shaft 40 would be driven at 30 rpm. Obviously, rotation of the output drive 54 at 750 rpm or 150 rpm via the motor X causes no damage whatsoever to the motor Y.

Preferably, the motor X is mounted in such a manner that it can reciprocate, i.e. move linearly, between positions leading to the operating shaft 40 being driven at the low, intermediate and high speeds discussed above. The motor X could, however, be pivotally mounted, or the belts A and B could be slackened by moving respective jockey pulleys (not shown).

It will be clear that the above is an application of the present invention in which two single-speed motors can be used to produce a total of 3 output speeds. It is thought that it may be possible to extend this to obtain even more output drive speeds, merely by using two single-speed motors. Clearly, if one or both of the motors is capable of being run at different speeds, there will be a corresponding increase in the number of output drive speeds.

I claim:

1. A drive system comprising a first pulley operably connected to drive a second pulley by a continuous stiff belt having a driving face which is wrapped around both of said pulleys, means for causing the belt to slacken relatively to the pulleys, and guide means which is elongate in the direction of said belt, at least a part of said guide means being movable from a first position in which the belt is tight and power is transmitted by the drive system, to a second position in which the belt is slack and power transmission is thus interrupted, the elongate guide means being adapted to bear upon at least one length of that face of the slackened belt generally opposed to the driving face, thereby shaping the slackened belt to prevent all contact, and consequently any frictional drag, of the slackened belt with at least one of said pulleys.

2. A drive system according to claim 1, in which the guide means, when in said second position, bears against substantially all of the length of the slackened belt.

3. A drive system according to claim 1, in which the guide means comprises plates carrying curved strips which extend perpendicularly from said plates.

4. A drive system according to claim 1, in which the guide means can shape the slackened belt so that it is in driving contact with neither of the pulleys.

5. A drive system according to claim 1, in which the belt slackening means comprises a pivotal mounting for at least one of the pulleys, the arrangement being such that the separation of the pulleys can be selectively varied by pivoting thereof.

6. A drive system according to claim 1, in which the belt slackening means comprises a jockey pulley which is movable between different positions in which different tensions are applied thereby to the driving face of the belt.

7. A drive system according to claim 1, in which the pulleys are of different diameter and are connected to be driven by respective motors; the arrangement being such that a first motor carrying the pulley of larger diameter may be safely turned over when power from the second motor is transmitted through the belt, whereas the belt can be slackened and then shaped by the guide means if there is a possibility that damage may be caused to said second motor when the first motor is running.

8. A drive system according to claim 7, in which one of the motors is connected to drive a lay shaft of a gear train by a further pair of pulleys having a further belt wrapped therearound, said further belt being capable of being slackened by further means therefor and of being shaped by further guide means when in its slackened condition to prevent driving contact with at least one of said further pair of pulleys.

9. A drive system according to claim 7, which is connected to a machine for cleaning clothes having an operating shaft to be driven at different speeds depending upon which of the two motors is running.

* * * * *